O. W. ROBINS.
Dough-Kneader.

No. 220,731.  Patented Oct. 21, 1879.

Witnesses:
Donn P. Twitchell
William W. Dodge

Inventor:
O. W. Robins
By his Attys.
Dodge & Son

UNITED STATES PATENT OFFICE.

OLIVER W. ROBINS, OF CEDAR RAPIDS, IOWA.

IMPROVEMENT IN DOUGH-KNEADERS.

Specification forming part of Letters Patent No. 220,731, dated October 21, 1879; application filed April 10, 1879.

*To all whom it may concern:*

Be it known that I, OLIVER W. ROBINS, of Cedar Rapids, in the county of Linn and State of Iowa, have invented certain Improvements in Dough Mixing and Kneading Machines, of which the following is a specification.

My invention relates to that class of mixing-machines which have a rotating body to contain the dough, and consists in making the body of cylindrical form, with an open unobstructed central space, and with alternate wide and narrow fixed ribs or shelves on the inside surface, as hereinafter specified, and in minor details.

Figure 1:
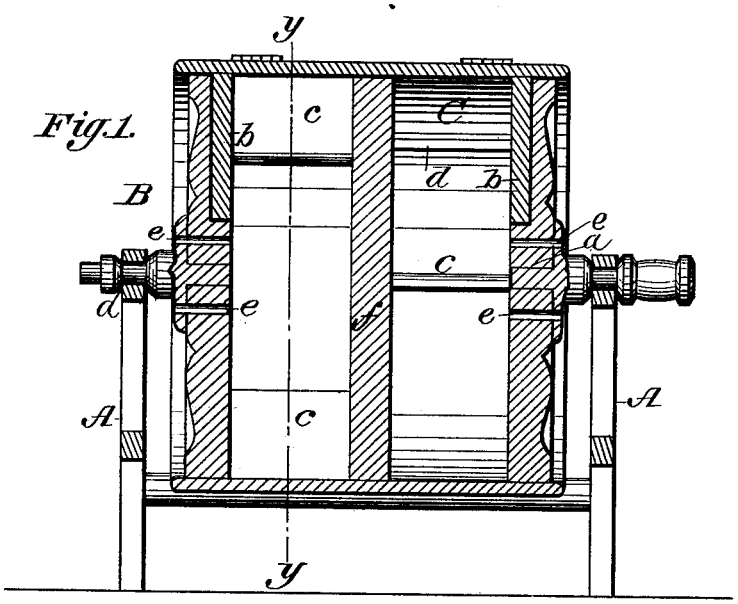
Figure 2:
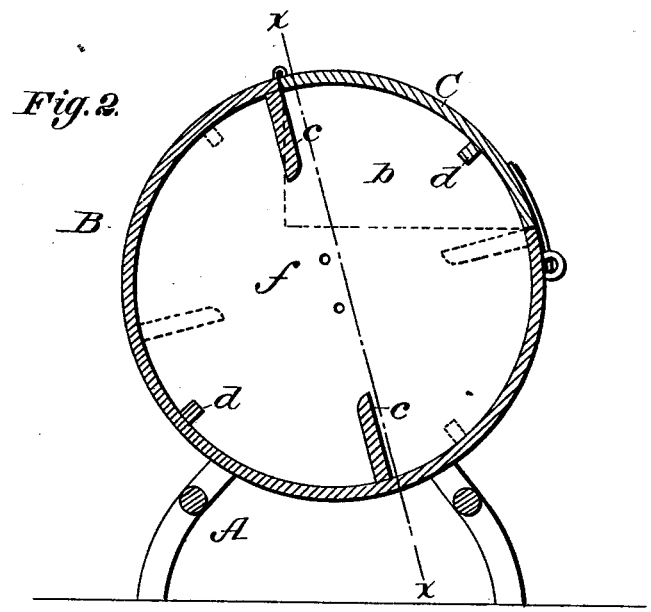

Figure 1 represents a longitudinal section through my apparatus on the line $x\,x$ of Fig. 2, and Fig. 2 represents a vertical transverse section of the same on the line $y\,y$ of Fig. 1.

In the drawings, A represents a frame, in which is journaled a cylindrical chest or drum, B, by means of gudgeons or journals $a$, secured to the heads of the chest in any convenient manner, and one of which is furnished with a crank or pulley by which to rotate the barrel.

C represents a section of the chest or drum, which is hinged to the body, in order that it may be opened for the admission of the dough or its ingredients to the interior, and which is furnished with a hook or other suitable fastening device, as shown. In order that the hinged portion C may be caused to form a tight joint with the body when closed, the heads of the drum are recessed or cut away on the interior to receive wings or heads $b$, secured to the hinged lid or cover C, while at the same time the cover is extended outward over and closely fitted to the heads, as shown. In this way an irregular joint is produced, and one which prevents the escape of any of the materials, while at the same time a flush smooth surface is secured inside.

Projecting inward from the walls or body of the drum or chest B, in radial planes, are alternate wide and narrow ledges or ribs $c$ and $d$, as indicated more clearly in Fig. 2, their office being to manipulate the dough, the wider ledges or ribs serving to raise or carry the dough upward to a point over, or nearly over, the center, when it is dropped or thrown downward upon the narrower ribs $d$. In falling upon the ribs $d$ the dough is drawn out or stretched without cutting or breaking the fiber, and thus, while the necessary working of the dough is secured, its quality is not impaired.

Perforations $e$ are formed in the heads of the chest or drum, either through or at one side of the gudgeons or journals, for the admission of air.

If desired, the chest or chamber B may be divided by vertical partitions $f$ into two or more chambers or compartments, whereby the simultaneous working of different kinds or qualities of dough is permitted. When the chamber is thus divided the wide ribs of one chamber are arranged in line with the narrow ribs of the adjoining chamber, in order to preserve the balance of the barrel as far as possible, and cause a regular even movement of the same.

When the dough is sufficiently worked or kneaded it may be molded in the cover C, which is then turned out and allowed to rest upon the table or platform on which the machine is supported, thus avoiding the necessity of the usual board and lessening the litter attending the usual method.

In practice the necessary ingredients to form the dough are introduced into the drum, and, if desired, slightly mixed. Then the cover is closed and fastened and the drum set in motion, the mixing and kneading being both effected thereby; but it is obvious that either of said operations may be performed by the machine, and the other by other means. This manner of proceeding is not, however, considered desirable.

I am aware that revolving bodies are old in dough-kneaders and washing-machines; that such bodies have been made of a rectangular form with longitudinal ribs, and of cylindrical form with diagonal bars, and hence I lay no claim thereto. In the construction of my device it is essential that the body shall be cylindrical, or practically so; that the partitions shall be of such width and arrangement as to lift readily a large mass of dough, and that the center shall be open and unobstructed, that the dough may fall violently from top to bottom.

Having thus described my invention, what I claim is—

1. A dough-mixing machine consisting of a horizontal rotary body of cylindrical form, having an unobstructed central space in its interior, and having on its inner surface alternate wide and narrow ribs, as described and shown, whereby it is caused to repeatedly lift the dough and permit the same to fall upon the narrow ribs, as shown.

2. The rotating drum B, divided into separate chambers, each provided with inwardly-projecting ribs, alternately wide and narrow, the wide ribs of one chamber being placed out of line with those of the adjoining chamber or chambers, substantially as and for the purpose described.

OLIVER W. ROBINS.

Witnesses:
U. C. BLAKE,
T. J. DUDLEY.